Nov. 7, 1961 S. DUINKER 3,008,081
FREQUENCY-TRANSFORMATION DEVICE COMPRISING
AT LEAST ONE NON-LINEAR ELEMENT
Filed June 17, 1957

INVENTOR
SIMON DUINKER
BY
AGENT

United States Patent Office 3,008,081

Patented Nov. 7, 1961

3,008,081

FREQUENCY-TRANSFORMATION DEVICE COMPRISING AT LEAST ONE NON-LINEAR ELEMENT

Simon Duinker, Eindhoven, Netherlands, assignor to North American Philips Company Inc., New York, N.Y., a corporation of Delaware Filed June 17, 1957, Ser. No. 666,000
Claims priority, application Netherlands July 28, 1956
7 Claims. (Cl. 321—69)

This invention relates to frequency-transformation devices comprising an alternating current source and at least one non-linear element coupled therewith.

Such devices are known, for example, from French patent specification No. 516,051. The devices described therein comprise, as a non-linear element, at least one inductance having a magnetic core which may be premagnetized or not. By means of periodic saturation of the core, alternately in one direction and in the opposite direction or each time again in the same direction, use being made of direct current premagnetization, the substantially sinusoidal current of an alternating current source is converted into short current pulses through this inductance. These current pulses contain numerous higher harmonics, of which the desired harmonic or harmonics is or are emphasized by means of tuned circuits and supplied to a consumer device.

It is furthermore known, for example from British patent specification No. 477,875, to utilise such a frequency-transformation device for producing a series of carrier waves of different frequencies, for example in a carrier-wave telephone system. In this case use is principally made of harmonics of a high order, in certain cases only of even or odd order, but in other cases of both orders.

In carrier-wave telephony, the various carrier waves must be very pure, since foreign frequency components may lead to "cross-talk." Furthermore, it is also necessary to avoid superposition of a low-frequency voltage on the carrier waves, since low-frequency modulation may result and this may become apparent as an interfering hum voltage.

It has been found that strong subharmonic may occur in a circuit having a non-linear element and which is fed from an alternating current source, more particularly of the non-linear element is an inductance having a premagnetised core. The subharmonics are in many cases of a very high order, for example 20, and hence of a comparatively low-frequency, which may result in a greatly interfering hum voltage. The occurrence of these subharmonics is attributable to a negative resistance effect in the non-linear element. If a subharmonic $q$ of fundamental frequency $p$ is temporarily produced, for example as a result of an interference, sum- and difference frequencies $q+np$ and $q—np$ also occur, wherein $n$ may be any arbitrary integer. If the difference frequencies in the load circuit of the current generator are damped more strongly than the sum frequencies, oscillations of the subharmonic frequency may build up and also further subsist therein. In fact, it can be mathematically shown that the power W$q$, which is available in the device for producing the subharmonic $q$, divided by the frequency $q$ of this subharmonic, is equal to:

$$-\sum_{n=1}^{\infty}\left[\frac{W'np+q}{np+q}-\frac{W'np-q}{np-q}\right]$$

wherein $W'np+q$ represents the powers derived at the corresponding frequencies.

It is possible to suppress the subharmonics in a frequency-transformation device by means of resistors. However, such resistors bring about a linearisation by which the desired non-linear effects are counteracted and the amplitude of the desired higher harmonics is greatly reduced, resulting in a materially decreased output of the device.

To suppress subharmonics of the fundamental frequency of the alternating current source, the frequency-transformation device according to the invention comprises at least one selective dissipative circuit, in which energy within a frequency-band containing principally the sum frequencies of at least one harmonic and of any existing subharmonic is dissipated, so that these subharmonics are damped out.

In order that the invention may be more readily carried into effect, several embodiments will now be described more fully, by way of example, with reference to the accompanying drawing, in which.

Figure 1:
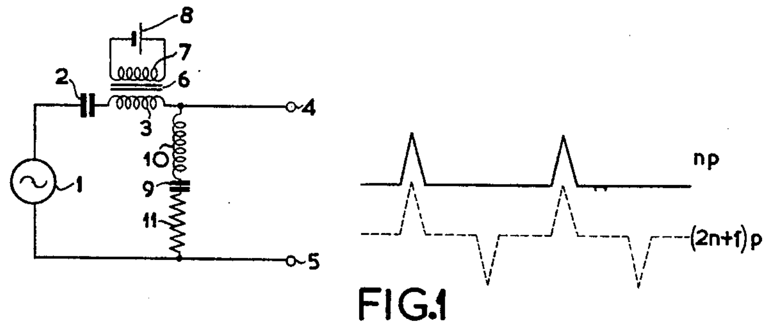
FIG. 1 shows a diagram of a particularly simple embodiment of the frequency-transformation device according to the invention.

The embodiment shown in FIG. 1 comprises a current generator 1, which supplies a sinusoidal voltage of frequency $p$ to the series-combination of a capacitor 2, an inductance 3 and a load connected to output terminals 4 and 5. The inductance 3 has a ferromagnetic core 6, which is so proportioned that it can easily be saturated by the current of generator 1. Arranged on the core 6 is a second winding 7, which is traversed by a direct current supplied by a direct voltage source 8. Connected parallel to the output terminals 4 and 5 is a selective dissipative circuit 9, 10, 11. This circuit is constituted by a series-resonant circuit comprising a capacitor 9, an inductance 10 and a resistor 11 connected in series therewith. Said circuit is damped by the resistor 11 so as to exhibit the desired bandwidth. Energy of a frequency with the frequency band of the circuit 9–11 is thus dissipated in the resistor 11. The circuit 9–11 is tuned to a frequency such that its frequency band lies substantially between the frequency of a harmonic of the frequency $p$ of the generator 1, for example between the fundamental frequency $p$, and the mean value of the frequencies of this harmonic and of the next following higher existing harmonic, for example between the frequency $p$ and the frequency 1½ $p$. Consequently, energy dissipated in this circuit lies principally in a frequency band containing the sum frequency of the fundamental and any existing subharmonics. The expression:

$$\Sigma\frac{W'np+q}{np+q}-\frac{W'np-q}{np-q}$$

is thus larger than zero and the said negative resistance effect is made impossible, so that any existing subharmonics cannot build up and are suppressed.

As previously mentioned, the inductance 3 may be saturated by the current of generator 1 and thus constitutes a non-linear element of the frequency-transformation device. By means of the direct current from the source 8, it is adjusted approximately to the knee of the saturation curve of the core 6, so that for example the positive half waves of the current of generator 1 drive the inductance farther into the saturation range, whereas the negative half waves drive it into the non-saturated range. With respect to these negative half waves, the inductance 3 thus has a comparatively high impedance, for example 50 times higher, than its impedance in the saturated state. The negative half waves of the current supplied by generator 1 are thus suppressed, whereas the positive half waves are passed with considerable distortion. Consequently, a load impedance connected to the terminals 4 and 5 has supplied to it a series of positive peaked pulses having a repetition frequency equal to the fundamental frequency $p$ of the generator. This series of pulses is very rich in even or odd higher harmonics and is shown in full line at the right of the terminals 4 and 5 and designated by the reference $np$.

It is alternatively possible to omit the premagnetizing winding 7 and the direct current source 8 and to operate the inductance 3 without pre-magnetisation. In this case and when the current of generator 1 has a sufficiently high value, both half waves of this current are greatly distorted, peaked positive and negative pulses being supplied alternately to the terminals 4 and 5. This series of pulses is shown in dashed line at the right of the terminals 4 and 5 and designated by the reference $(2n+1)p$, since it is very rich in odd higher harmonics.

The capacitor 2 still further increases the difference between the series-impedance of the circuit 2, 3 with saturated inductance 3 and its impedance with non-saturated inductance 3. Its value may, for example, be chosen such that, together with the saturated inductance 3, it exhibits a series-resonance approximately at the frequency $p$ of generator 1. The fundamental frequency $p$ and two directly sequential higher harmonic frequencies $2np$ and $(2n+1)p$ are shown in the frequency diagram of FIG. 2. In order that energy of frequencies equal to the sum frequencies of, for example, the fundamental $p$ and any possible subharmonics be dissipated more strongly than energy of frequencies equal to the difference frequency of $p$ and of these subharmonics, the selective dissipative circuit 9, 10, 11 of the embodiment shown in FIG. 1 should have a frequency characteristic approximately as indicated in dashed line in FIG. 2, between the frequencies $p$ and $1\frac{1}{2}$ $p$. It would be ideal, for example for this circuit to have an approximately rectangular frequency characteristic, as shown in dotted line. However, the subharmonics generated in the above-described manner are in most cases of a comparatively high order and there is in practice little risk of a subharmonic of the second or of the third order occurring, so that the frequency band of the selective dissipative circuit may be narrower, for example as indicated in full line, between the frequencies $p$ and 1.3 $p$.

Figure 2:
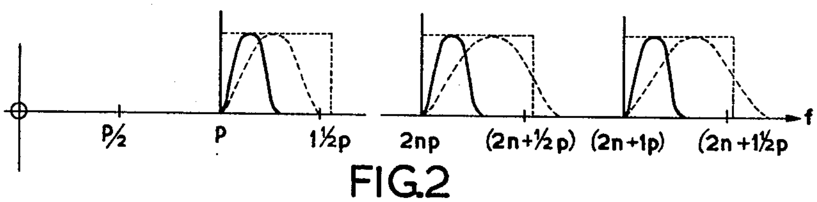
FIG. 2 shows a frequency diagram illustrating the operation of the devices according to the invention and FIG. 3 shows a diagram of a second embodiment of the device according to the invention.

The device shown in FIG. 1 may be used for producing a series containing both even and odd harmonics or a series of odd harmonics, in which event the frequency difference between two existing sequential harmonics is equal ot $2p$. If the frequency-transformation device is used for producing a series of carrier waves, for example in a carrier-wave telephone system, the first harmonics of the series are in most cases not utilised. It is then advantageous to proportion the selective dissipative circuit 9, 10, 11 in a manner such that its frequency band lies just about the frequency of the first higher harmonic used, for example above the frequency $2np$ (FIG. 2) in case of a series of even higher harmonics, or above the frequency $(2n+1)p$ in case of a series of odd higher harmonics. If desired, use may be made of two or more such selective dissipative circuits, each circuit having a different frequency band located substantially between the frequency of a first higher harmonic and the mean value of the frequency of this first and that of the next following existing higher harmonic. Since the distances between the frequencies of the sequential higher harmonics in a series of even or odd harmonics are $2p$, the bandwidth of such a selective dissipative circuit may be larger than 0.5 $p$, so that even an subharmonic of the second order, if existing, can thus be suppressed. FIG. 2 shows, in dashed lines, for example, the frequency characteristics of comparatively wide selective dissipative circuits, the frequency bands of these circuits lying between $2np$ and $(2n+\frac{2}{3})p$ and between $(2n+1)p$ and $(2n+1\frac{2}{3})p$ respectively. Ideal frequency characteristics for such circuits are rectangular, also in this case, and a little wider than $\frac{1}{2}$ $p$, as indicated in dotted line. Frequency characteristics which are sufficient in practice are shown in full line with a bandwidth of about 0.3 $p$.

Figure 3:
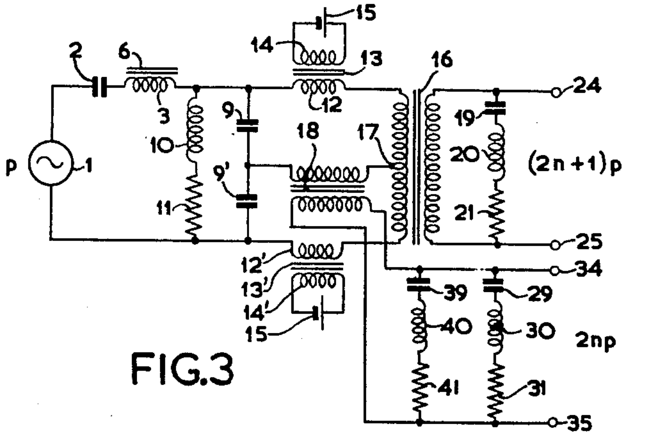

The second embodiment shown in FIG. 3 comprises the series-combination of a capacitor 2, an inductance 3 and load circuits connected to terminals 24—25 and 34—35, respectively, a sinusoidal voltage being applied to this series-combination by means of a generator 1. The inductance 3 has a ferromagnetic core 6, which may be readily saturated by the current supplied by generator 1. The winding 7 and the direct current source 8 of the embodiment shown in FIG. 1 are omitted however, so that this core is not premagnetised. A selective dissipative circuit in the form of a parallel resonance circuit is connected to the series-combination of generator 1, capacitor 2 and inductance 3. Said resonance circuit comprises two equal and series-connected capacitors 9 and 9′, and the series-combination of an inductance 10 and a resistor 11 connected in parallel therewith. The circuit 9, 9′, 10, 11 is tuned to a frequency slightly higher than $p$, for example, to the frequency 1.15 $p$, and has a frequency characteristic as shown in full line in FIG. 2, having a bandwidth of about 0.3 $p$. As previously explained with reference to the first embodiment, it would be possible to derive from the terminals of the resonant circuit 9–11 a series of alternately positive and negative peaked pulses which is rich in odd higher harmonics. However, said circuit also comprises means which allow of deriving two separate series of higher harmonics. Said means comprise two inductances 12 and 12′ having saturable cores 13 and 13′ of ferromagnetic material, which are pre-magnetised up to a knee of the magnetic characteristic by means of second windings 14 and 14′ and direct current sources 15 and 15′. Said inductances operate in a manner which may be compared with that of rectifiers and are connected in series with one another and with the primary winding of a transformer 16 inserted between them, said series-combination being connected to the terminals of the resonant circuit 9–11. The primary winding of transformer 16 is provided with a tapping 17, which is connected to the common point of the two capacitors 9 and 9′ via the primary winding of a second transformer 18. The secondary winding of transformer 16 is connected to output terminals 24 and 25, whilst the secondary winding of transformer 18 is connected to output terminals 34 and 35.

By means of capacitor 2 and inductance 3, a series of pulses of a form as shown in dashed lines in FIG. 1, at the right of the terminals 4 and 5, are supplied to the terminals of the resonant circuit 9–11. Said pulses are rich in odd higher harmonics. They are further distorted by the inductances 12 and 12′, through which pulses of opposite direction are supplied to one and the other half, respectively, of the primary winding of transformer 16. These pulses thus produce pulses of corresponding polarities in the secondary winding of transformer 16, so that a series of output pulses of the same form as shown in dashed lines in FIG. 1 is supplied to the terminals 24 and 25. These output pulses are thus rich in odd harmonics, as indicated by the reference $(2n+1)p$ between the terminals 24 and 25. The pulses alternately passed by the inductances 12 and 12′ also flow through the primary winding of transformer 18. However, this winding is invariably traversed in the same direction by the pulses, so that output pulses of the form shown in full lines in FIG. 1 occur across the output terminals 34 and 35. The repetition frequency of these pulses is however equal to that of the pulses of alternate polarities occurring at the output terminals 24, 25 and this series of pulses is thus rich in even harmonics, as indicated by the reference $2np$ between the terminals 34 and 35.

To obtain a better suppression of any existing subharmonics this second embodiment comprises three further selective dissipative circuits. A second selective dissipative circuit is constituted by a series-resonant circuit included between the terminals 24 and 25 and comprising a capacitor 19, an inductance 20 and a resistor 21. This circuit shows a frequency band lying principally between the frequency of a first higher harmonic of the series of odd higher harmonics existing between the terminals 24 and 25 and the mean value of the frequency of the first of these higher harmonics and that of the next following odd higher harmonic; its frequency characteristic may, for example, exhibit one of the forms shown in FIG. 2 at the right of the frequency $(2n+1)p$. A third and a fourth selective dissipative circuit are constituted by series-resonance circuits connected to the output terminals 34 and 35. Each of these circuits comprises the series-combination of a capacitor 29, 39 respectively, an inductance 30, 40 respectively, and a resister 31, 41 respectively. The circuit 29–31 is tuned, for example, to a frequency slightly higher than that of the first existing even higher harmonic $2np$ and the circuit 39–41 is tuned, for example, to a frequency slightly higher than that of the next following even higher harmonic $(2n+2)p$.

By means of the various selective dissipative circuits 9–11, 19–21, 29–31 and 39–41, any possible subharmonics are suppressed with security. A series of odd harmonics may be derived from the terminals 24 and 25, whilst a series of even higher harmonics may simultaneously be derived from the terminals 34 and 35. By means of filters and/or resonant circuits (not shown) it is readily possible to separate these even or odd higher harmonics from one another and to produce therefrom two series of different carrier-waves. Since the subharmonics are suppressed, these carrier waves are free from superimposed low-frequency voltages or modulations and thus fulfill in this respect the requirements which, in a carrier-wave telephone system are imposed in practice upon such carrier waves. With respect to the useful carrier waves, the device is moreover substantially unloaded, so that it operates with a satisfactory efficiency.

What is claimed is:

1. A frequency-transformation device comprising a source of alternating current having a fundamental frequency, at least one non-linear element coupled to said source to produce harmonic frequencies of said fundamental frequency and having the characteristic of producing one or more undesired subharmonic frequencies of said fundamental frequency, and at least one frequency-selective dissipative circuit coupled to said non-linear element and tuned to dissipate energy within a frequency band containing at least one frequency equal to the sum of one of said harmonic frequencies and of one of said subharmonic frequencies, whereby said subharmonic frequencies are substantially damped out.

2. A device as claimed in claim 1, in which said frequency-selective dissipative circuit is tuned to have a dissipation frequency bandwidth lying between said fundamental frequency and the mean value of the fundamental and second harmonic frequencies, whereby energy having a frequency equal to the sum of the fundamental and subharmonic frequencies is dissipated more than energy having a frequency equal to the difference of the fundamental and subharmonic frequencies.

3. A device as claimed in claim 1, in which said frequency-selective dissipative circuit is tuned to have a dissipation frequency bandwidth lying between one of said harmonic frequencies and the mean value of said one harmonic frequency and the frequency of the next higher harmonic, whereby energy having a frequency equal to the sum of said one harmonic frequency and any subharmonic frequencies is dissipated more than energy having a frequency equal to the difference of said one harmonic frequency and said subharmonic frequencies.

4. A device as claimed in claim 1, including a first means connected to said non-linear element for deriving even harmonic frequencies of said fundamental frequency, a second means connected to said non-linear element for deriving odd harmonic frequencies of said fundamental frequency, and additional frequency-dissipative circuits coupled respectively to said first and second means and tuned to dissipate energy within a frequency band containing the sum frequency of at least one of said harmonic and one of said subharmonic frequencies.

5. A device as claimed in claim 1, in which said frequency-selective dissipative circuit comprises a damped resonant circuit.

6. A device as claimed in claim 5, in which said damped resonant circuit comprises a series-connected combination of a capacitor, an inductor, and a resistor.

7. A frequency transformation device comprising a source of alternating current having a fundamental frequency, inductance means having a magnetic core, means coupling said inductance means to said source, an output circuit coupled to said inductance means, said alternating current having sufficient magnitude to periodically saturate said core to produce currents in said output circuit containing harmonics of said fundamental frequency, and means for suppressing subharmonics of said frequency comprising frequency selective dissipative means tuned to dissipate energy within a frequency band containing the sum frequency of one of said harmonic frequencies and one of said subharmonic frequencies more than in the frequency band containing the difference frequency of said one harmonic and subharmonic frequencies, whereby said subharmonic frequencies are substantially damped out, said frequency selective dissipative means comprising the only means for suppressing said subharmonic frequencies in said device.

References Cited in the file of this patent

UNITED STATES PATENTS

| | | |
|---|---|---|
| 1,762,346 | Osnos | June 10, 1930 |
| 1,885,728 | Kieth | Nov. 1, 1932 |
| 2,117,752 | Wrathall | May 17, 1938 |
| 2,138,996 | Blumlein | Dec. 6, 1938 |
| 2,146,053 | Campbell et al. | Feb. 7, 1939 |
| 2,317,482 | Peterson | Apr. 27, 1943 |
| 2,418,641 | Huge | Apr. 8, 1947 |

FOREIGN PATENTS

| | | |
|---|---|---|
| 495,435 | Canada | Aug. 18, 1953 |